United States Patent
Brückner et al.

(10) Patent No.: US 12,487,191 B2
(45) Date of Patent: Dec. 2, 2025

(54) METHOD FOR INSPECTING A SOFT CONTACT LENS FOR THE PRESENCE OF AN ORANGE PEEL DEFECT

(71) Applicant: Alcon Inc., Fribourg (CH)

(72) Inventors: Jasmin Brückner, Aschaffenburg (DE); Anika Braunwarth, Obernburg (DE); Thomas Wasse, Wörth (DE); Felix Brinckmann, Roßdorf (DE)

(73) Assignee: Alcon Inc., Fribourg (CH)

( * ) Notice: Subject to any disclaimer, the term of this patent is extended or adjusted under 35 U.S.C. 154(b) by 206 days.

(21) Appl. No.: 18/352,487

(22) Filed: Jul. 14, 2023

(65) Prior Publication Data
US 2024/0019381 A1  Jan. 18, 2024

Related U.S. Application Data

(60) Provisional application No. 63/368,699, filed on Jul. 18, 2022.

(51) Int. Cl.
*G01N 21/958* (2006.01)

(52) U.S. Cl.
CPC ... *G01N 21/958* (2013.01); *G01N 2021/9583* (2013.01)

(58) Field of Classification Search
CPC .......... B29D 11/0098; G01M 11/0278; G01N 2021/9583; G01N 21/958
USPC ...................................................... 356/239.1
See application file for complete search history.

(56) References Cited

U.S. PATENT DOCUMENTS

| | | | | |
|---|---|---|---|---|
| 4,679,917 A | * | 7/1987 | Genco | A61B 3/10 351/243 |
| 5,528,357 A | * | 6/1996 | Davis | G01M 11/0214 356/124 |
| 5,719,669 A | * | 2/1998 | Ross, III | G01B 11/255 356/127 |
| 2017/0089802 A1 | * | 3/2017 | Tonn | G01M 11/08 |
| 2018/0306732 A1 | | 10/2018 | Smorgon | |
| 2019/0323920 A1 | | 10/2019 | Smorgon | |

FOREIGN PATENT DOCUMENTS

EP  1248092 A2  10/2002
KR  20040082271 A  *  9/2004

* cited by examiner

*Primary Examiner* — Sunghee Y Gray
(74) *Attorney, Agent, or Firm* — Sheng-Hsin Hu

(57) ABSTRACT

A method for inspecting a soft contact lens for an orange peel defect comprises the steps of: illuminating the whole lens through the transparent bottom with incoherent white illumination light;
capturing an image of the lens at an image capturing location arranged in an image capturing direction different from a transmission direction;
detecting in the image the intensity of white light scattered by the lens in the image capturing direction;
comparing the detected intensity of the scattered white light with a threshold intensity; determining whether the image comprises at least one coherent area in which the detected intensity of the scattered white light is higher than the threshold intensity, and which is larger than a predetermined threshold size; and
rejecting the lens as comprising an unacceptable orange peel defect in case the at least one coherent area is larger than the predetermined threshold size.

3 Claims, 4 Drawing Sheets

METHOD FOR INSPECTING A SOFT CONTACT LENS FOR THE PRESENCE OF AN ORANGE PEEL DEFECT

FIELD

The present invention relates to a method for inspecting a soft contact lens for the presence of an unacceptable orange peel defect.

BACKGROUND

Soft contact lenses, in particular soft contact lenses for single use which are disposed of after being worn, are automatically inspected, among others, for the presence of unacceptable cosmetic defects during their manufacture and prior to being delivered to the customers. Inspection of the soft contact lenses is normally performed by automated lens inspection equipment which is arranged in the production line. This automated lens inspection equipment captures images of the soft contact lens, and subsequently performs an image analysis to automatically determine whether or not a soft contact lens is acceptable.

Cosmetic defects of soft contact lenses comprise cosmetic defects such as, for example, inclusions, bubbles, small particles, etc., which are well-visible and can be reliably detected during the lens inspection performed by the conventional automated lens inspection equipment. Unfortunately, however, soft contact lenses may comprise additional other cosmetic defects. One such additional other cosmetic defect is the so-called 'orange peel' defect. An orange peel defect, as its name says, manifests itself as very small dimples which are present at the surface of the soft contact lens (like the dimples on the outer surface of the peel of an orange). However, these dimples are so small that they are normally not detected by automated inspection equipment. Also, orange peel defects are typically not present on the whole surface of the soft contact lens but may occur only in some dedicated regions of the surface.

Orange peel defects occur in very rare instances only. Accordingly, samples of the manufactured soft contact lenses are drawn from the production line at regular intervals and are visually inspected offline by experienced operators for the presence of orange peel, as orange peel may possibly (but not necessarily) affect the user's vision and is unwanted in any event. Typically, such offline visual inspection of a soft contact lens by the experienced operators is performed with a microscope (such as an Optispec ME 5900 of the company Domaille Engineering, Rochester, MN, United States), so that in performing the visual offline inspection an enlarged image of the soft contact lens itself is analyzed for the presence of orange peel defects which—even in the enlarged image—may only hardly or even not be visible. The enlarged image of the soft contact lens generated by the microscope is therefore visually analyzed region by region, in particular as orange peel defects may occur only in some dedicated regions of the surface of the soft contact lens. This is a cumbersome process for the operators, is subject to personal assessment, and an orange peel defect may not be reliably detected visually.

It is therefore an object of the instant invention to suggest a method that overcomes the afore-mentioned disadvantages and allows for a less cumbersome inspection and detection of unacceptable orange peel defects present at the surface of a soft contact lens.

This object is achieved by the method according to the instant invention as it is specified by the features of the independent claim. Additional advantageous aspects of the method according to the invention are the subject of the dependent claims.

SUMMARY OF THE INVENTION

In accordance with the invention, a method for inspecting a soft contact lens for the presence of an unacceptable orange peel defect at the surface of the soft contact lens is suggested, the method comprising the steps of:
  providing an inspection receptacle having a transparent bottom and containing a liquid;
  immersing the soft contact lens to be inspected in the liquid;
  illuminating the whole soft contact lens immersed in the liquid through the transparent bottom of the inspection receptacle with incoherent white illumination light;
  capturing an image of the soft contact lens at an image capturing location arranged in an image capturing direction which is different from a transmission direction in which a first portion of the illumination light is transmitted through the soft contact lens without being scattered by the soft contact lens;
  detecting in the image of the soft contact lens the intensity of white light contained in a second portion of the illumination light which is scattered by the soft contact lens in the image capturing direction;
  comparing the detected intensity of the white light contained in the scattered second portion with a predetermined threshold intensity;
  determining whether the image of the soft contact lens comprises at least one coherent area at the surface of the soft contact lens in which the detected intensity of the white light contained in the scattered second portion is higher than the predetermined threshold intensity, the at least one coherent area at the surface of the soft contact lens having a size larger than a predetermined threshold size; and
  rejecting the soft contact lens as comprising an unacceptable orange peel defect at the surface of the soft contact lens in case the size of the at least one coherent area is larger than the predetermined threshold size.

According to an aspect of the method according to the invention, the step of determining whether the image of the soft contact lens comprises at least one coherent area having a size larger than a predetermined threshold size may comprise the steps of:
  displaying the image of the soft contact lens, and
  determining in the displayed image of the soft contact lens the size of the coherent area at the surface of the soft contact lens.

In accordance with a further aspect of the method according to the invention, the soft contact lens comprises pigment particles giving the soft contact lens a pale color, and the scattered second portion of the illumination light causes the image of the soft contact lens to have a background color which is complementary to the pale color of the soft contact lens. The at least one coherent area at the surface of the soft contact lens is an area of white color mixing with the background color.

In accordance with yet a further aspect of the method according to the invention, the method further comprises the step of arranging a color filter between the soft contact lens and the image capturing location, the color filter being configured to block that wavelength range of the scattered second portion of the illumination light causing the background color of the image of the soft contact lens.

The method according to the invention has a number of advantages. First of all, it is no longer the orange peel defect itself at the surface of the soft contact lens (i.e. the dimpled surface) that must be visually detected by an operator in the image of the soft contact lens (which is extremely difficult to detect, even for experienced operators). Rather, what is detected is the intensity of white light contained in the portion of the illumination light that is scattered by the soft contact lens in the image capturing direction. And it is the intensity of this white light which is indicative of the presence or absence of an orange peel defect.

In this regard, 'capturing the image of the soft contact lens at an image capturing location arranged in an image capturing direction which is different from a transmission direction' means that image capturing is performed in a dark-field observation configuration.

The predetermined threshold intensity is the intensity based on which the determination is made whether or not at a certain location orange peel is detected: If the intensity of the white light at a particular location at the surface of the contact lens is higher than the threshold intensity in the captured image of the soft contact lens, then the presence of orange peel is determined at this particular location. Otherwise, no orange peel is detected at this particular location.

An orange peel defect is determined to be present at the surface of the soft contact lens under inspection in case there is at least one coherent area (i.e. one or more coherent areas) of a size larger than a predetermined threshold size in which orange peel is determined to be present. More frankly speaking, this means that there is a coherent area of particular locations at the surface of the soft contact lens at which orange peel is determined to be present.

This determination can be made in a fully automatically, but can also be made by the operator visually inspecting the afore-described captured image of the soft contact lens. But even if the determination is not made automatically but is made by an operator, the method is still significantly advantageous over the previously known method (of visually inspecting the microscope image of the soft contact lens), since the detection is much more reliable due to the orange peel defect being a visible coherent area of white light which can be reliably recognized in the captured image of the soft contact lens.

The size of such coherent area can be determined with suitable tools known in the art in image analysis. For example, the operator may mark the boundary of such (well visible) coherent area in the capture image, and the size of the marked area can then be calculated by a computer. This size is then compared with a predetermined threshold size, and the determination as to whether or not an orange peel defect is present is then made based on this comparison.

Alternatively, the size of such coherent area can be determined fully automatically by detecting the intensity of the white light at a particular location (e.g. with the aid of suitable sensors such as CCD sensors). The comparison whether the detected intensity of the white light is higher or lower than the threshold intensity is then made fully automatically at the particular location. In this manner, it is further possible to detect a coherent area in which the detected intensity of the white light is higher than the threshold intensity. In case such coherent area is detected, the determination of the presence of an orange peel defect can be made fully automatically.

As is mentioned, the method is a method for inspecting a soft contact lens. Soft contact lenses (including, for example, silicone hydrogel lenses) have a high water content so that they are comfortable when being worn on the eye, however, due to their high water content they also have certain disadvantages. For example, when they are kept in a non-liquid environment the soft contact lenses may dry (and may get wrinkled or otherwise deformed), and in such dry state an inspection of the soft contact lens does not make any sense. Also, in case a droplet may come into contact with the (concave) surface of the soft contact lens, the soft contact lens may fold, and it does not make any sense to inspect such folded soft contact lens either.

This is why in accordance with the method of the invention an inspection receptacle containing a liquid is provided, and why the soft contact lens to be inspected is immersed in the liquid (such as, for example, phosphate buffered saline PBS, or water). Due to being immersed in the liquid, the soft contact lens is in a wet and unfolded state during inspection. The bottom of the inspection receptacle is transparent to allow illumination light to impinge on the soft contact lens under inspection through the transparent bottom of the inspection receptacle. And it is the whole soft contact lens that is illuminated with incoherent white illumination light at the same time while being immersed in the liquid rather than only a portion of the soft contact lens. And depending on whether or not orange peel is present, white light having an intensity higher than the threshold intensity is contained in the light scattered by the illuminated soft contact lens in the image capturing direction in which the image of the soft contact lens is captured at an image capturing location (e.g. by a CCD camera or by any other suitable image capturing device), as is explained above.

The afore-explained determination of whether or not the image of the soft contact lens comprises a coherent area having a size larger than a predetermined threshold size may comprise displaying the image of the soft contact lens (e.g. on a color or non-color screen). The coherent area at the surface of the soft contact lens may then be determined in the displayed image of the soft contact lens. And while again the determination of the size of the coherent area can be made either by an operator or fully automatically, the displayed image renders such coherent area visible (even in case the determination of the size of the coherent area is not made by the operator but is made automatically, it is visible on the screen).

In some instances, a soft contact lens comprises pigment particles giving the soft contact lens a pale color. For example, such pigment particles may give the soft contact lens a pale bluish color that helps the user identify the lens in the storage solution contained in a primary packaging shell, once the user has peeled the cover foil off the primary packaging shell and wants to remove the lens from the packaging shell. For example, in the case where the pigment particles give the soft contact lens a pale bluish color these pigments scatter a portion of the incoherent white illumination light in the image capturing direction. The color of the light scattered by these pigment particles in the image capturing direction is complementary to the color given to the lens by the pigment particles. In the afore-mentioned example in which the pigment particles give the soft contact lens a pale bluish color, the complementary color is orange so that the captured image of the soft contact lens has a background color that is orange. In case the inspected soft contact lens does not have an orange peel defect, the captured image of the soft contact lens is entirely orange. However, in case orange peel is present at the surface of the soft contact lens, in the image of the soft contact lens the area in which orange peel is present at the surface of the soft contact lens is an area of white color mixing with the orange background color, so that the captured image of the soft contact lens has an orange background color with one ore more areas of white color mixing with this background color. This is well visible in the captured image of the soft contact lens and is indicative of the presence of orange peel.

A color filter may be arranged between the soft contact lens and the image capturing location to block that wavelength range of the scattered second portion of the illumination light causing the background color of the soft contact lens. Thus, the background color (in the example: orange) is no longer visible in the image of the soft contact lens but rather it is a black and white image in which the contrast is increased.

Further advantageous aspects become apparent from the following description of embodiments of the method according to the invention with the aid of the drawings in which.

Figure 1:
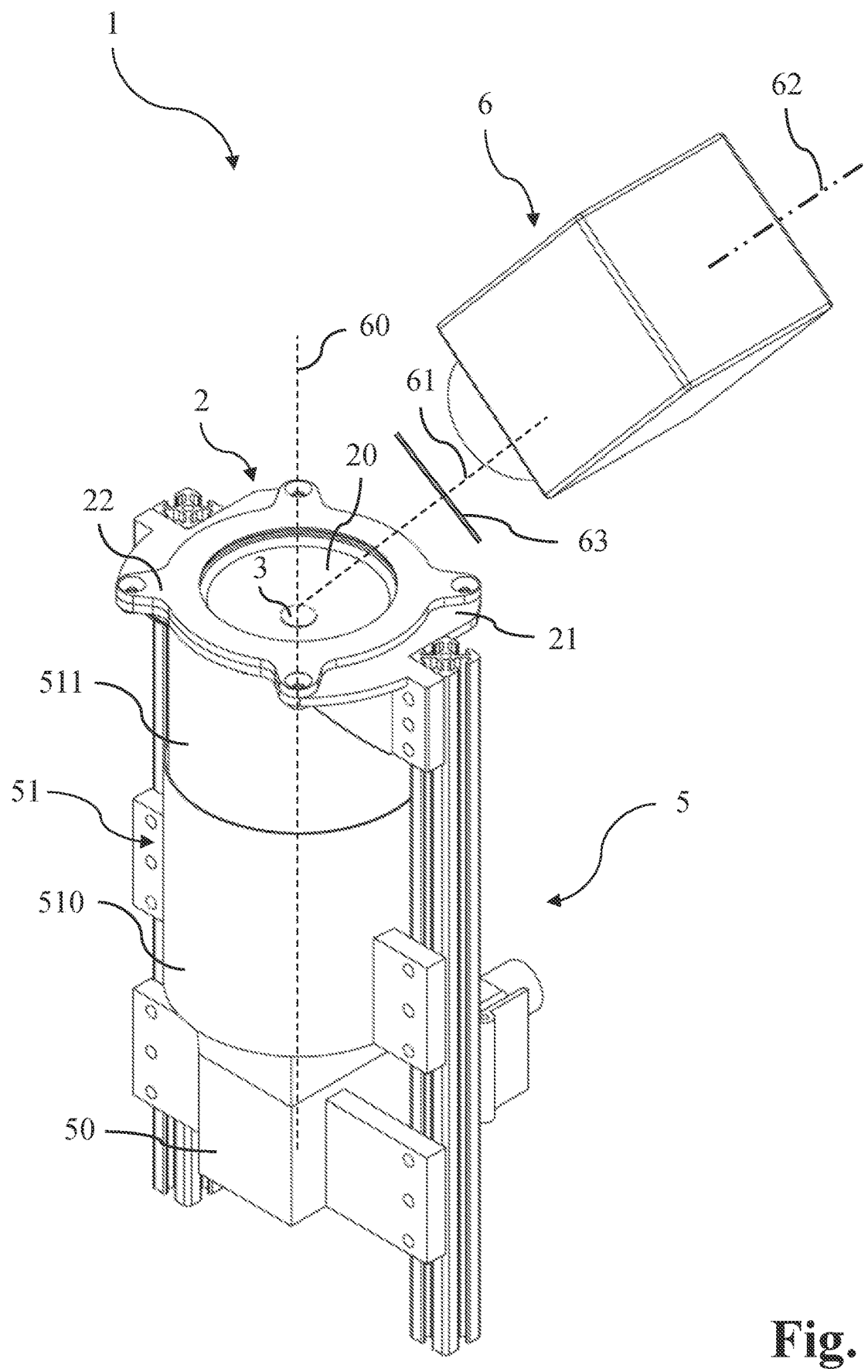
FIG. 1 shows a perspective view of an embodiment of an apparatus for carrying out the method according to the invention.
Figure 2:
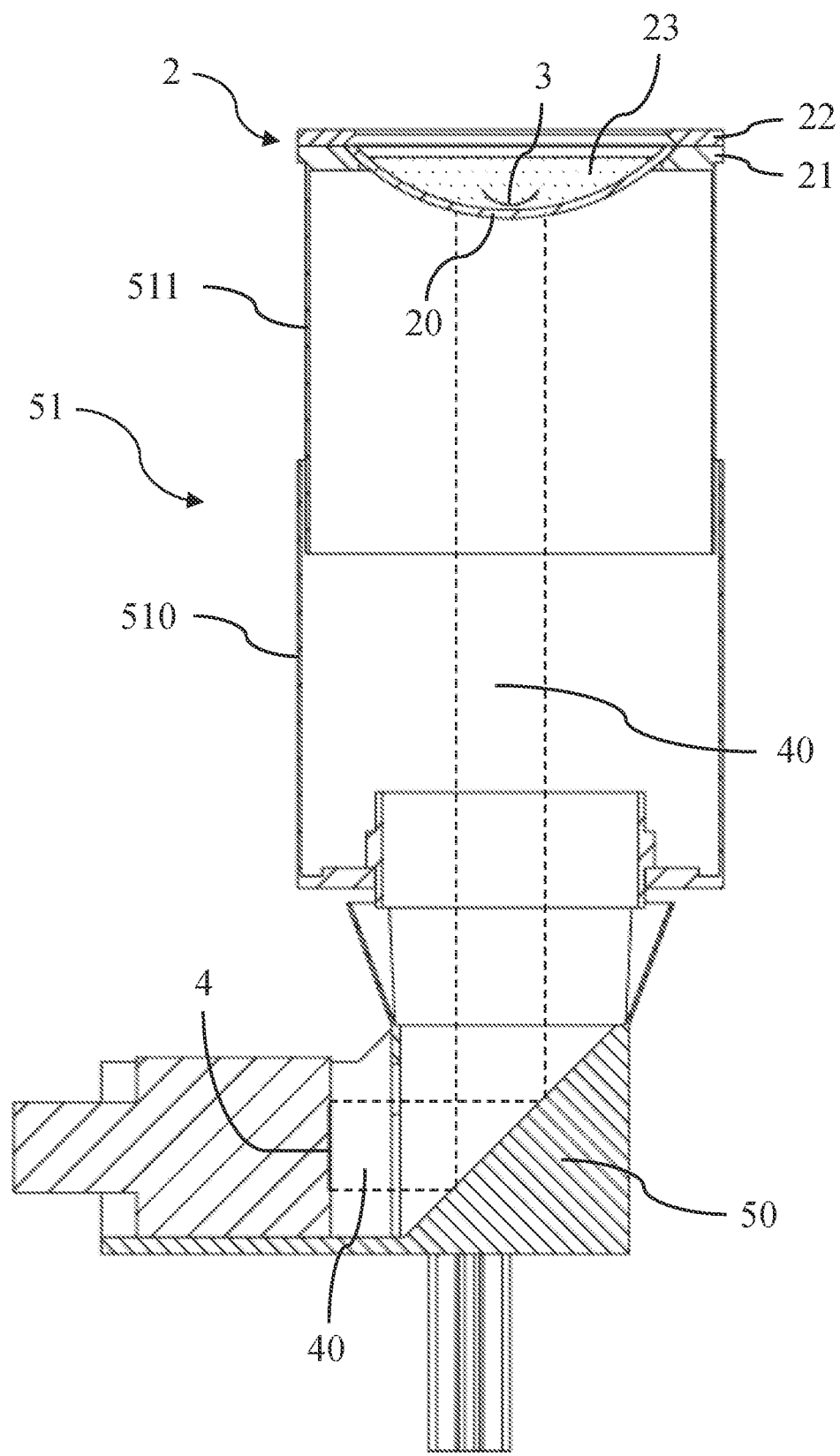
FIG. 2 shows a cross-sectional view of the apparatus shown in FIG. 1 (without the camera)

FIG. 1 shows a perspective view of an embodiment of an apparatus 1 for carrying out the method according to the invention, and FIG. 2 show the apparatus of FIG. 1 in a cross-sectional view. The apparatus 1 comprises an inspection receptacle 2 which—in the embodiment shown—comprises a concave shell 20 forming the bottom of the inspection receptacle 2. Concave shell 20 is transparent to visible light, is held by a carrier 21, and is covered by a lid 22. For example, the concave shell 20 of the lid 22 may be made of glass. Concave shell 20 contains a liquid 23, such as—for example—water or (phosphate buffered) saline, in which a soft contact lens 3 to be inspected for the presence of orange peel is immersed. The apparatus further comprises a light source 4 which emits incoherent white illumination light, such as for example a light emitting diode (LED) or a halogen light source. For the sake of simplicity, the light source 4 shown is embodied to emit a collimated beam 40 of white illumination light. Further, the apparatus 1 comprises a light guiding and directing arrangement 5 that comprises a reflector 50 and a light guiding tube 51 which—in the embodiment shown—comprises opaque tubular elements 510 and 511 which are unable to reflect the beam 40 of white illumination light. Yet further, the apparatus comprises a camera 6 arranged at an image capturing location which is arranged in a direction 61 (indicated by a dashed line) different from a transmission direction 60 (also indicated by a dashed line) in which a first portion of the beam 40 of white illumination light is transmitted through the soft contact lens 3 without being scattered by the soft contact lens 3. Camera 6 may be connected to a computer (as indicated by the dashed and dotted line 62) which in turn may be connected to a color display (not shown), or may be directly connected to the display (not shown).

Operation of the embodiment of the apparatus 1 is described in the following. Once the concave shell 20 has been filled with liquid 23 and the soft contact lens 3 to be inspected has been immersed in the liquid 23 and has settled down at the lowermost point of concave shell 20, inspection of the soft contact lens 3 may be performed. As the soft contact lens 3 may dry out and get wrinkled or, due to its softness, may fold once a droplet may get inadvertently deposited on the back surface of the soft contact lens 3, inspection of the soft contact lens 3 in a dry state is not advantageous and may even be impossible. To avoid this, inspection is performed with the soft contact lens 3 being fully immersed in the liquid 23.

The soft contact lens 3 may or may not contain pigment particles giving the contact lens a pale color that is not perceived by the user. However, as a soft contact lens is often provided in a blister-type package that comprises a primary packaging shell having a bowl in which the soft contact lens 3 is stored in a storage solution and having a cover foil sealed to the primary packaging shell, it allows the user to easily and quickly find the otherwise transparent soft contact lens 3 in the (also transparent) storage solution contained in the bowl once the cover foil has been peeled off the primary packaging shell.

The whole soft contact lens 3 immersed in the liquid 23 is then illuminated through the concave shell 20 at the same time (i.e. no subsequent illumination of certain areas of the soft contact lens 3) with the aid of the illumination beam 40 of white incoherent light emitted by the light source 4. The beam 40 which is reflected at reflector 50 then impinges on the soft contact lens 3 through the concave shell 20. In the case of pigment particles being contained in the soft contact lens 3, a portion of the white incoherent light is scattered by the pigment particles contained soft contact lens 3 in the direction of the camera 6 (which is arranged in a dark field observation configuration). The color of this light scattered by the pigment particles contained in the soft contact lens 3 is complementary to the pale color given to the soft contact lens 3 by the pigment particles. For example, the pigment particles contained in the soft contact lens 3 may give the soft contact lens 3 a pale bluish color. In this case, the complementary color is orange, and the image of the soft contact lens 3 captured by the camera 6 has an orange background color.

Figure 3:
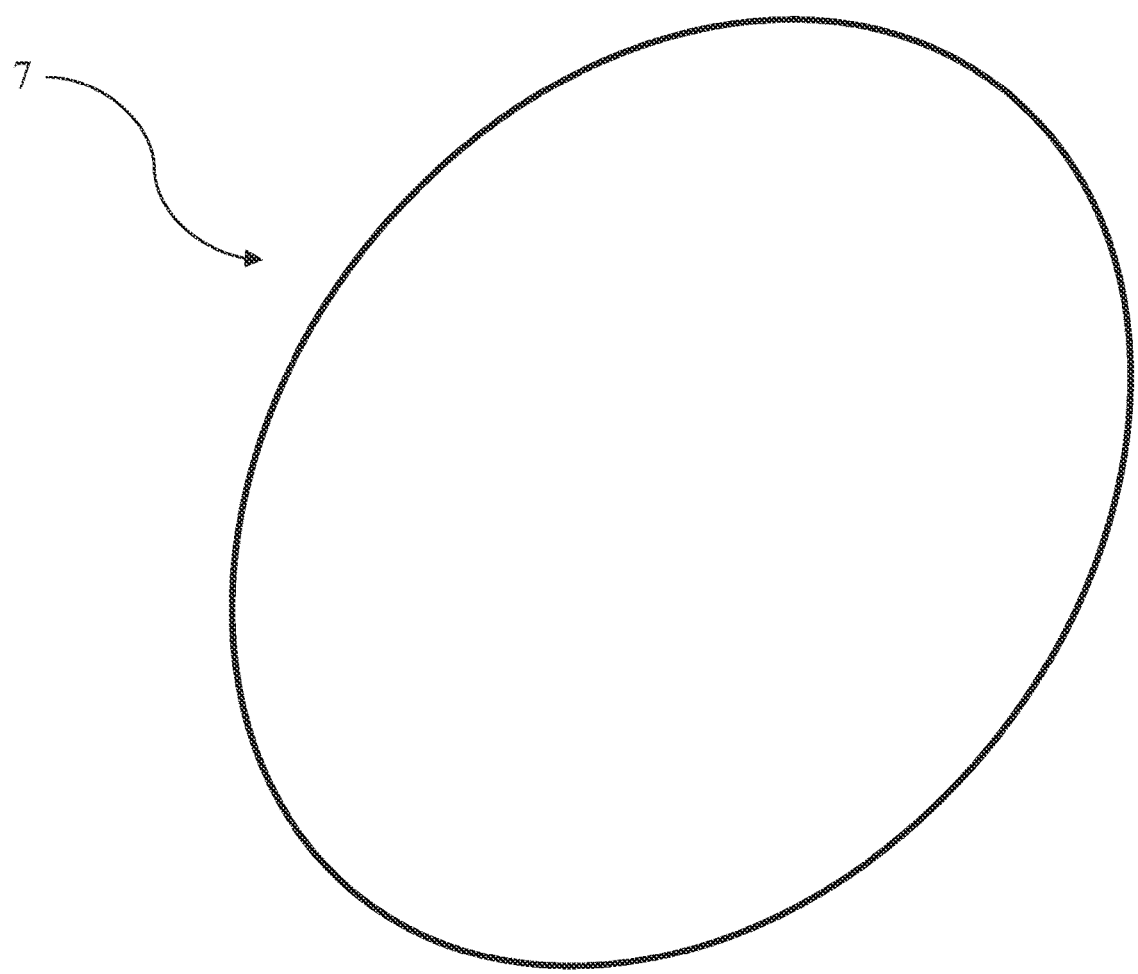
FIG. 3 shows an image of a soft contact lens without any orange peel defect.

In case the soft contact lens 3 does not comprise any areas in which orange peel is present, the image 7 of the soft contact lens 3 appears uniformly orange, with no areas of a different color contained in the image 7 (see FIG. 3). In contrast thereto, if the soft contact lens 3 has coherent areas in which orange peel is present, these areas appear as coherent areas (of adjacently arranged pixels in the image 7) of white color mixing with the orange background color of the image 7 of the soft contact lens 3. In such area 70, 71 and 72, the intensity of the white light detected in the image 7 or the soft contact lens 3 must be higher than a predetermined threshold intensity in order for the area to be displayed (or determined) as a white color area.

Figure 4:
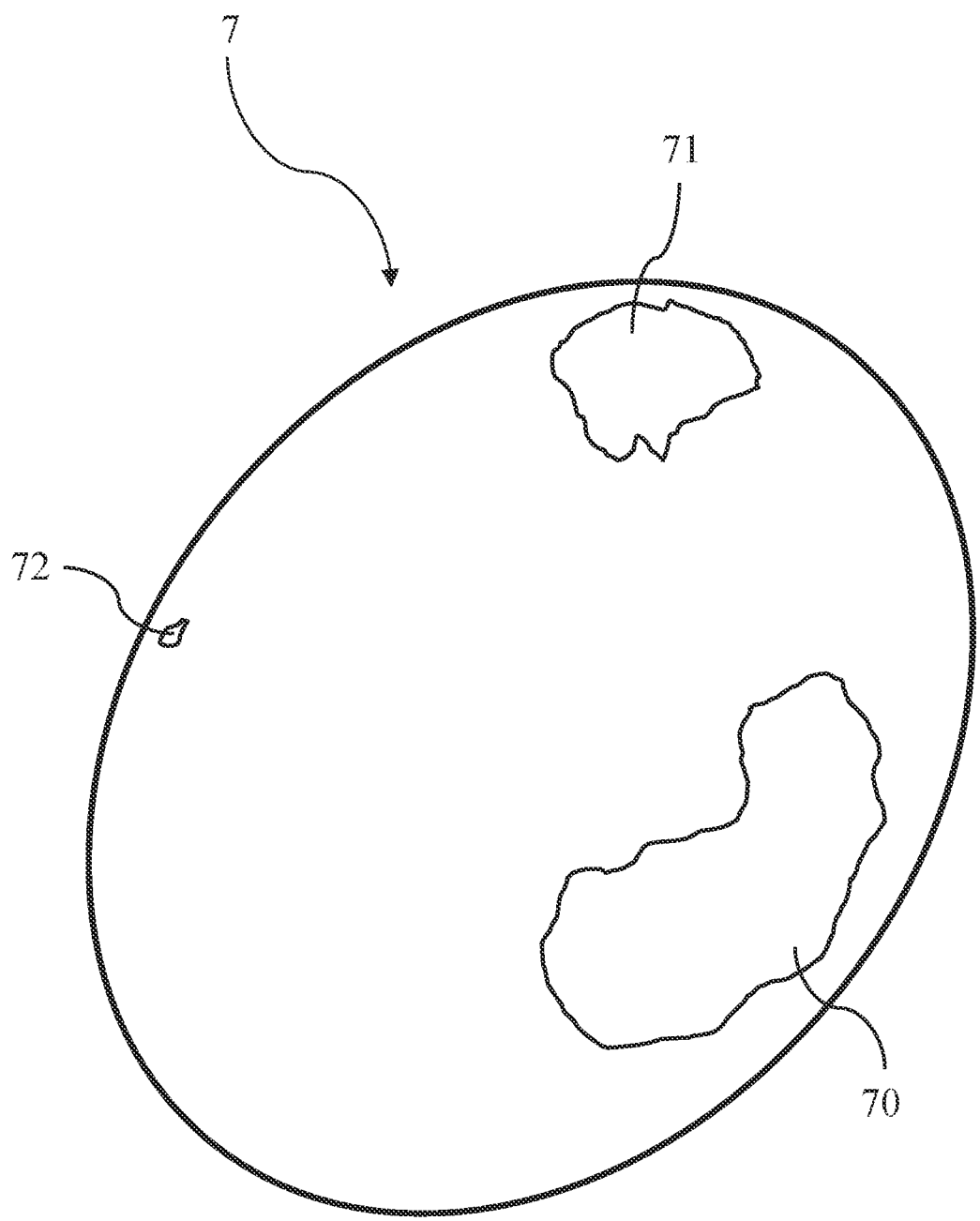
FIG. 4 shows an image of a soft contact lens with orange peel defects.

Three such areas 70, 71 and 72 are indicated in the image 7 shown in FIG. 4. Such areas 70, 71 and 72 are believed to be caused by portions of the beam 40 of white illumination light scattered by the orange peel of the soft contact lens 3 (rather than by the pigment particles contained in the soft contact lens 3), and these portions scattered by the orange peel manifest themselves as areas 70, 71 and 72 of white scattered light in the image 7 which mix with the orange background color of the image 7 caused by the (bluish) pigment particles contained in the soft contact lens 3.

As can be seen in FIG. 4, the three coherent areas 70, 71 and 72 are of different size. Coherent area 70 has the largest size, followed by coherent area 71 that has the second largest size, and further followed by coherent area 72 that has the smallest size. Such areas can be determined either by an operator, for example by marking the boundary of the respective area 71 and 72 with the aid of suitable image processing and evaluation tools and subsequent calculation of the size of the marked area by the computer. Alternatively, the size of the respective area 70, 71 and 72 can be automatically determined by suitable image processing software that is known in the art. Regardless of the method used for determining the size of the area 70, 71 and 72, once the size of the respective area 70, 71 and 72 has been determined it is compared with a predetermined threshold size, and if the determined size of one of the areas 70, 71 and 72 is larger than the predetermined threshold size the presence of an orange peel defect is determined. And while area 70 and 71 are larger than the predetermined threshold size (and therefore an orange peel defect will be determined in any event), the area 72 may possibly be determined as being below the predetermined threshold size. However, in order to avoid that lenses which may even possibly have a small orange peel defect, the threshold size may be selected to be very small, so that even the size of area 72 will lead to the determination of an orange peel defect being present.

In case it is desired to further enhance the contrast between the background color of the image 7 of the soft contact lens 3 one option may be to arrange a color filter 63 the soft contact lens and the image capturing location where the camera 6 is arranged to capture the image 7 of the soft contact lens. This color filter 63 may then be configured to block that wavelength range of the scattered light that caused the background color of the soft contact lens 3, so that the captured image 7 is (more or less) a black-and-white image.

In any event, in case during inspection it has been determined that the inspected soft contact lens 3 has an orange peel defect, the minimal consequence is that this soft contact lens 3 is disposed of to avoid distribution of such lens to a customer. In case the afore-described inspection can be performed fully automated in-line during production (i.e. in the production line during production of the soft contact lenses), it is sufficient that the respective soft contact lens 3 which has been determined to comprise an orange peel defect is disposed of.

As orange peel is an extremely rare defect, it may be justified that only samples of the soft contact lenses that have otherwise passed the inspection in the production line be drawn from the production line and be inspected off-line. If in such instances the presence of orange peel is detected during the off-line inspection of the samples, it may be required that the whole lot of soft contact lenses produced actually produced be disposed of to avoid distribution of a soft contact lens having an orange peel defect.

In any event, the inspection of soft contact lenses is significantly improved when compared to the (more or less subjective) microscopic inspection of the soft contact lenses 3 by experienced operators which are presently state of the art.

While embodiments of the invention have been described with the aid of the drawings, the invention is not limited to these embodiments, but rather modifications thereof using the same technical teaching are believed to also be encompassed by the invention. Therefore, the scope of protection is defined by the appended claims.

The invention claimed is:

1. Method for inspecting a soft contact lens (3) for the presence of an unacceptable orange peel defect at the surface of the soft contact lens (3), the method comprising the steps of:

providing an inspection receptacle (2) having a transparent bottom (20) and containing a liquid (23);

immersing the soft contact lens (3) to be inspected in the liquid (23);

illuminating the whole soft contact lens (3) immersed in the liquid through the transparent bottom (20) of the inspection receptacle (2) with incoherent white illumination light (40);

capturing an image (7) of the soft contact lens (3) at an image capturing location arranged in an image capturing direction (61) which is different from a transmission direction (60) in which a first portion of the illumination light is transmitted through the soft contact lens without being scattered by the soft contact lens (3);

detecting in the image (7) of the soft contact lens (3) the intensity of white light contained in a second portion of the illumination light which is scattered by the soft contact lens (3) in the image capturing direction (61);

comparing the detected intensity of the white light contained in the scattered second portion with a predetermined threshold intensity;

determining whether the image (7) of the soft contact lens (3) comprises at least one coherent area (70, 71, 72) at the surface of the soft contact lens in which the detected intensity of the white light contained in the scattered second portion is higher than the predetermined threshold intensity, the at least one coherent area (70, 71, 72) at the surface of the soft contact lens having a size larger than a predetermined threshold size; and rejecting the soft contact lens (3) as comprising an unacceptable orange peel defect at the surface of the soft contact lens in case the size of the at least one coherent area (70, 71, 72) is larger than the predetermined threshold size, wherein the soft contact lens (3) comprises pigment particles giving the soft contact lens (3) a pale color, and wherein the scattered second portion of the illumination light causes the image (7) of the soft contact lens to have a background color which is complementary to the pale color of the soft contact lens (3), and wherein the at least one coherent area (70, 71, 72) at the surface of the soft contact lens is an area of white color mixing with the background color.

2. Method according to claim 1, wherein the step of determining whether the image of the soft contact lens comprises at least one coherent area (70, 71, 72) having a size larger than a predetermined threshold size comprises the steps of:

displaying the image (7) of the soft contact lens, and determining in the displayed image (7) of the soft contact lens the size of the coherent area (70, 71, 72) at the surface of the soft contact lens.

3. Method according to claim 1, further comprising the step of arranging a color filter (63) between the soft contact lens (3) and the image capturing location, the color filter being configured to block that wavelength range of the scattered second portion of the illumination light causing the background color of the image (7) of the soft contact lens.

* * * * *